(12) United States Patent
Worley

(10) Patent No.: US 7,313,668 B2
(45) Date of Patent: Dec. 25, 2007

(54) IMMEDIATE VIRTUAL MEMORY

(75) Inventor: John S. Worley, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 463 days.

(21) Appl. No.: 10/768,306

(22) Filed: Jan. 29, 2004

(65) Prior Publication Data

US 2005/0172098 A1 Aug. 4, 2005

(51) Int. Cl.
*G06F 12/00* (2006.01)
(52) U.S. Cl. .................. 711/207; 711/154; 711/217
(58) Field of Classification Search ............... None
See application file for complete search history.

(56) References Cited

U.S. PATENT DOCUMENTS 6,857,041 B2 * 2/2005 LeClerg ...................... 711/103

OTHER PUBLICATIONS

Solomon, David A., "Inside Windows NT", 1998, Microsoft Press, 2nd Edition, pp. 219-220, 246-247, 256-259, 261-262, 265-267, 273-275.*
Wemm, Peter, "Re: Meaning of 'Page Faults with Physical IO'?", Aug. 15, 1997 accessed at <http://www.squid-cache.org/mail-archive/squid-users/199708/0124.html> on Feb 8, 2006.*
Tanenbaum, Andrew S., "Structured Computer Organization", 1984, Prentice-Ahll, Inc., 2nd Edition, pp. 10-12.*
Microsoft Developer Network Library—Win32 Software Developement Kit, Jul. 1996.*
Popov, Petko, "Inflable Arrays in Win32", Sep. 21, 2001 accessed at <http://www.codeguru.com/cpp/cpp/cpp_mfc/buffers/print.php/c4113/> on Feb 6, 2006.*
Sloane, Tony, "Two's Complement", May 9, 1996 accessed at <http://www.cs.jcu.edu.au/Subjects/cp1200/1996/org/node9.html on Feb. 14, 2006.*
Nakhimovsky, Greg, "Virtual Memory Arrays for Application Software", © Mar. 2003, Sun Microsystems, Inc., pp. 1-11.*

* cited by examiner

*Primary Examiner*—Brian R. Peugh

(57) ABSTRACT

Various embodiments of the present invention provide for immediate allocation of virtual memory on behalf of processes running within a computer system. One or more bit flags within each translation indicate whether or not a corresponding virtual memory page is immediate. READ access to immediate virtual memory is satisfied by hardware-supplied or software-supplied values. WRITE access to immediate virtual memory raises an exception to allow an operating system to allocate physical memory for storing values written to the immediate virtual memory by the WRITE access.

31 Claims, 5 Drawing Sheets

IMMEDIATE VIRTUAL MEMORY

TECHNICAL FIELD

The present invention is related to computer architecture and computer operating systems and, in particular, to a method and system for efficiently providing default values to software without allocating or initializing the memory pages and without occupying space in the memory hierarchy.

BACKGROUND OF THE INVENTION

The present invention is related both to computer architecture and to computer operating systems. Although the present invention has many different alternative embodiments with respect to different, particular computer hardware platforms and computer-operating-system architectures, the present invention can be completely and straightforwardly described with respect to a simplified and generalized conceptualization of virtual-to-physical-address translation for one computer architecture.

FIG. 1 illustrates generalized virtual-to-physical-address translation employed in a wide variety of modern computer systems, and implemented in a wide variety of currently available computer operating systems. A virtual address 101 generally fills a single, naturally sized computer word for a given computer and computer-operating-system architecture. In most systems, a virtual address 101 is stored in a hardware register, and is used by the processor or processors within a computer system to locate a corresponding natural word stored in the computer system's memory hierarchy 131, 137, 139, and 129. The process by which a unit of physical memory corresponding to virtual address is located within physical memory is referred to as "virtual address translation," and the stored information 109 that facilitates a particular virtual address translation is referred to as a "translation."

Normally, a virtual address 101 comprises a number of higher-order bits 103 that together compose a virtual page number, and a number of lower-order bits 105 that together compose a page offset. Computer-system hardware and a computer operating system together translate virtual addresses into physical addresses that directly identify a memory location corresponding to the virtual address. Mapping of virtual addresses to physical memory locations provides great flexibility to computer systems with regard to memory implementations. For example, a computer system may provide, through virtual addresses, a much larger process address space than could be accommodated, at a given instance in time, in the physical, random-access memory available within the computer system. In such systems, the computer hardware and a computer operating system collaborate to maintain virtual memory pages most likely to be next accessed in physical memory, and maintain virtual memory pages less likely to be accessed in the near future on larger capacity mass storage devices. Virtual memory pages can migrate from mass storage devices to physical memory and from physical memory to mass storage devices dynamically, as programs execute and access virtual memory. Virtual memory also allows a computer system to provide to each of numerous, concurrently running processors the illusion that each process enjoys private access to an entire virtual-memory address space, and may facilitate security measures, inter-process memory sharing, and provide additional types of benefits to computer operating systems and to computer users.

In an exemplary computer system, during a first virtual-to-physical-address translation, a computer processor, computer-operating-system routine, or a combination of a processor and computer-operating-system software extract the virtual page number 103 from a virtual address stored within a register and use the virtual page number 107 to locate a corresponding entry 109 within a translation look-aside buffer 111. The translation look-aside buffer ("TLB") 111 stores most recently accessed virtual page translations to assist in virtual-address translation. In many systems, the TLB is stored in specialized, high-speed TLB registers, and is backed up by a lower-speed virtual hash page table ("VHPT"), in turn backed up by translations stored on mass storage devices. For the purpose of the describing the present invention, it is sufficient to understand that the TLB stores a set of current virtual-page-to-physical-page translations to facilitate virtual-to-physical-address translation.

Each TLB entry, such as TLB entry 109, includes a virtual page number 113, a corresponding physical page number 115, many additional fields that may describe privilege level, access rights, protection keys, and other such information used by the operating system to control access to virtual memory pages, represented in FIG. 1 by spaces 117 and 119, and a number of bit flags 121-125. In many computer systems, a bit flag referred to as a "present bit" (bit flag 125 in FIG. 1), indicates whether or not the virtual-memory page currently resides in physical memory. When, during memory access, the present bit indicates that the virtual memory page corresponding to the TLB entry does not currently reside in physical memory, a page fault occurs, and the operating system uses 127 the virtual page number 113 to locate the contents of the virtual page in mass storage 129 and copy the located virtual page into a location in physical memory, such as the L1 cache memory 131, and updates the physical page number 115 to reflect the location in memory in which the contents of the virtual page has been copied from the mass storage 129. By contrast, when the present bit of the TLB entry indicates that the physical page corresponding to the virtual page is resident within memory, the contents of the physical memory location corresponding to the virtual address may be directly accessed 133 by supplying the physical page number 115 and the page offset 105 to a memory subsystem 135, which reads the contents of the physical address from, or writes a value to, the corresponding memory location in one of a tiered system of caches, including the L1 cache 131, the L2 cache 137, and main memory 139. Whether virtual-to-physical-address translation is carried out entirely by processor logic, by the processor under control of firmware, or by the processor under control of operating system software routines depends on the particular computer-system hardware platform and operating system within a computer system. In the exemplary architecture, an access-rights field in each TLB entry specifies the types of access allowed to the virtual memory page corresponding to the TLB entry. Access types include no access, read access, write access, execute access, and a privilege-promotion access used allow execution of operating system code using an enter-privileged-code instruction. The access rights field comprises 3 bits in the exemplary architecture, each of the 8 possible values specifying one or more access rights for each possible privilege level. The value of the access-rights field, combined with the value of a 2-bit privilege-level field within the TLB entry, completely specifies the access rights available to a process running at each of four possible privilege levels.

When an operating system or application program begins execution, or when additional memory is allocated for operating system or program use, a computer system commonly allocates a large number of virtual pages on behalf of the operating system or application program. In many cases, the operating system or application program expects that newly allocated virtual pages are initialized to a default value. The expected default value is commonly the value "0" for each byte within the newly allocated virtual memory page. In many currently available computer systems, the newly allocated virtual memory pages are fully instantiated, meaning that, when sufficient physical memory is available, a physical memory page corresponding to the virtual memory page is assigned for the virtual memory page and that the physical memory page is initialized to the default value.

FIG. 2 illustrates allocation of five virtual memory pages on behalf of a process. As shown in FIG. 2, physical pages 202-206 corresponding to five virtual memory pages are allocated in memory 210, corresponding TLB entries 212-216 are placed into the TLB 218, and the physical pages 202-206 are initialized to contain a default value. In general, virtual memory pages are either immediately initialized, under program control, as part of the virtual-page allocation process, or selected from a pool of pre-initialized pages that are zeroed or otherwise initialized in a background, operating-system process. In either case, initialization of the virtual-memory pages is computationally expensive, and may involve significant time delays for nascent processes or for processes allocating additional memory resources prior to undertaking a particular task. In some cases, a greater number of virtual memory pages are allocated than actually needed by a process, and allocated virtual-memory pages may never be written to, but only read from, or may never be accessed during the life of a process.

Designers, manufactures, and users of computer systems have recognized that allocation of virtual-memory pages for initializing processes, and for processes that dynamically supplement their virtual memory during operation, represents a significant computational and time overhead. Therefore, manufactures, designers, and users of computer systems have recognized the need for systems and methods that efficiently initialize newly allocated virtual-memory pages.

SUMMARY OF THE INVENTION

Various embodiments of the present invention provide for immediate allocation of virtual memory on behalf of processes running within a computer system. One or more bit flags within each translation indicate whether or not a corresponding virtual memory page is immediate. READ access to immediate virtual memory is satisfied by hardware-supplied or software-supplied values. WRITE access to immediate virtual memory raises an exception to allow an operating system to allocate physical memory for storing values written to the immediate virtual memory by the WRITE access.

BRIEF DESCRIPTIONS OF THE DRAWINGS

DETAILED DESCRIPTION OF THE INVENTION

Embodiments of the present invention provide immediate virtual memory in a computer system. Immediate virtual memory is represented, in the computer system, by virtual-memory-to-physical-memory translations with one or more bit flags, each set to one of two binary values. In the present discussion, an immediate bit flag with the binary value "1" indicates that the virtual memory specified by the translation is immediate, while an immediate bit flag with the binary value "0" indicates that normal virtual address translation and subsequent physical memory access, as described previously, proceeds. An opposite bit-flag-value convention may be employed in alternative embodiments.

Figure 3:
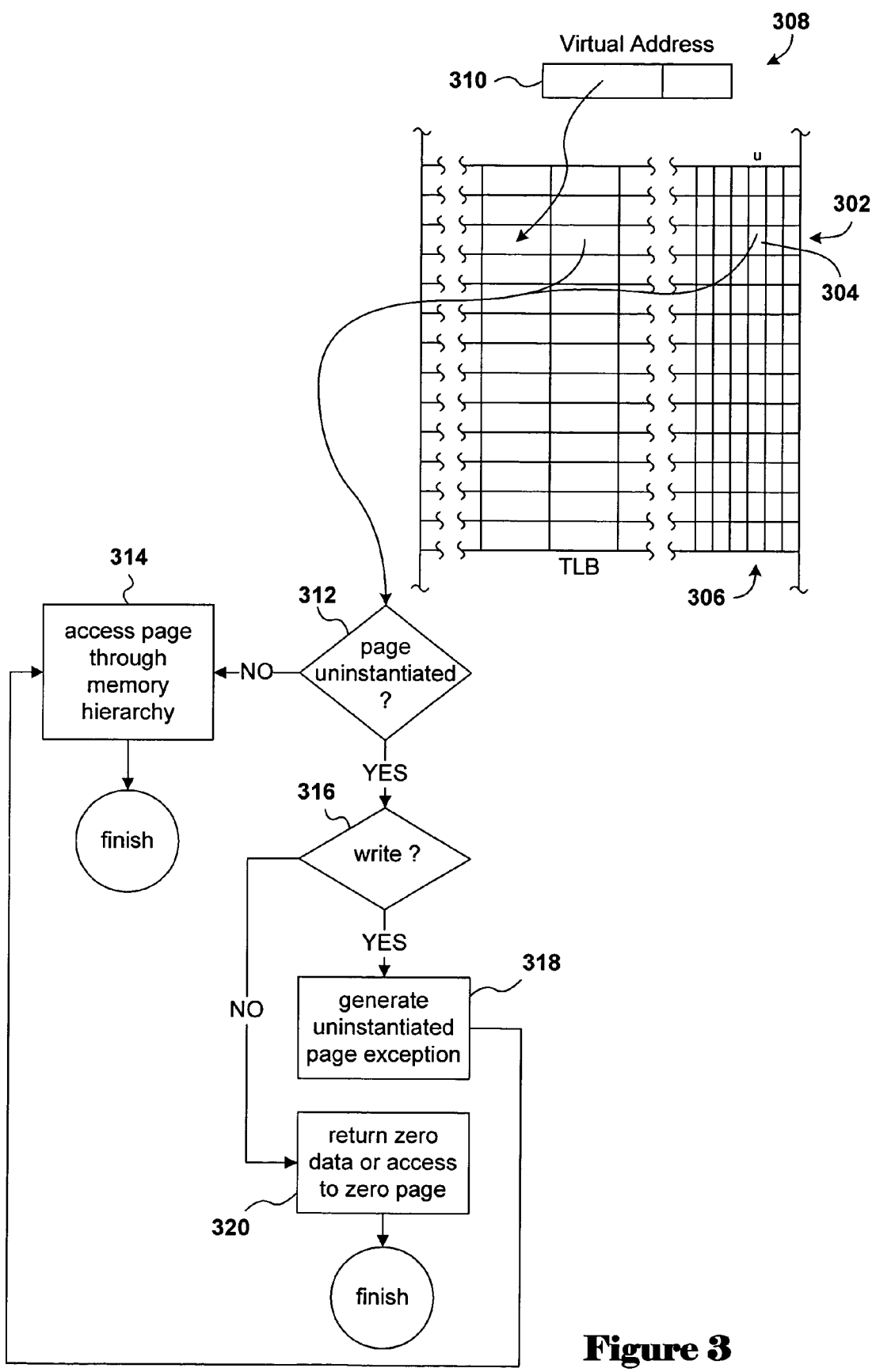
FIG. 3 shows a logical mechanism embodied in processor logic for implementing uninstantiated virtual memory pages according to one embodiment.

FIG. 3 shows a logical mechanism embodied in processor logic for implementing uninstantiated virtual memory pages. This mechanism may be employed in the exemplary processor used as a basis for describing embodiments of the present invention, and may be suitably modified for use in different system and processor architectures. As shown in FIG. 3, each translation, such as translation 302, includes an immediate bit flag 304. The immediate bit flags for all the translations shown in FIG. 3 form a column of bit flags 306. The virtual-to-physical-address-translation process is modified, as shown in FIG. 3, to accommodate immediate virtual memory pages. First, a virtual address stored in a hardware register 308 is accessed by processor logic for virtual-to-physical-address translation. The virtual page number 310 is extracted from the register 308 and used to locate the translation 302 corresponding to the virtual page number. In many modern processors, hashing logic within the processor is employed to hash the virtual page number into a TLB entry location. If a matching translation is not found, a TLB-miss fault occurs, which allows the operating system to find the corresponding TLB entry in the VHPT or other, similar operating-system-managed, memory-resident data structures and, if need be, in mass-storage space managed by the operating system.

Once the processor logic identifies the translation corresponding to the virtual page number extracted from the virtual address, the processor logic determines, in logic step 312, whether or not the memory is immediate by considering the value of the immediate bit flag. If the virtual memory page is not immediate, as determined in logic step 312, then the processor logic translates the address and accesses the physical memory normally.

Figure 1:
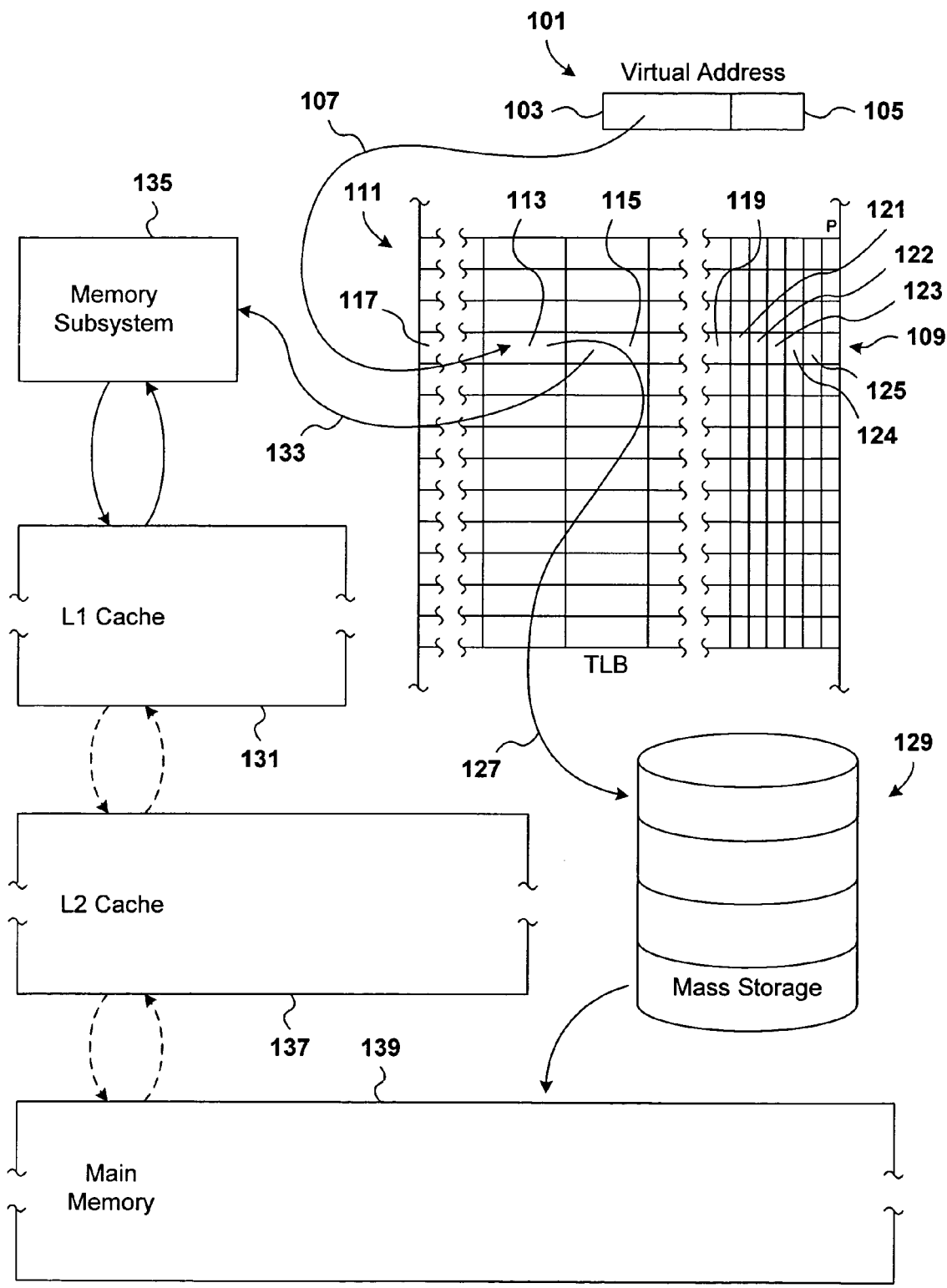
FIG. 1 illustrates generalized virtual-to-physical-address translation employed in a wide variety of modem computer systems, and implemented in a wide variety of currently available computer operating systems.
Figure 2:
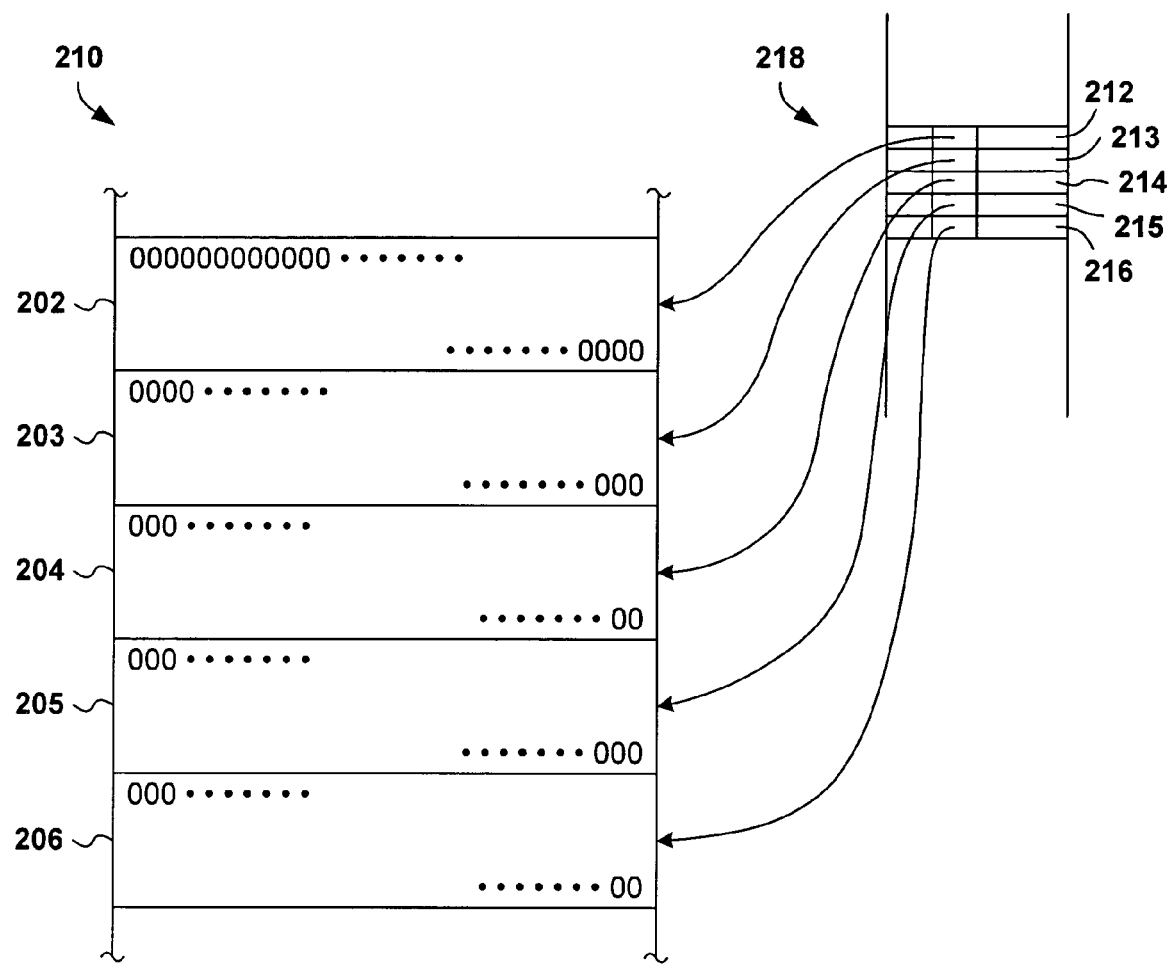
FIG. 2 illustrates allocation of five virtual memory pages on behalf of a process.

However, when the memory is immediate, new logic steps that represent a portion of various embodiments of the present invention are undertaken. First, in logic step 316, the processor logic determines whether or not the virtual address is being accessed for a WRITE operation. If so, then control flows to logic step 318, where the processor logic raises an exception, which may be either a normal access rights exception, or may be a new exception for writing to immediate virtual memory. The exception is handled by the operating system, which allocates a physical memory page corresponding to the virtual memory page containing the virtual address and programmatically initializes the newly allocated physical memory page, or obtains a zero-filled page from a specially maintained pool of free, zero-filled pages. As discussed above, a common default initialization value is "0" for all bytes within a newly allocated page. Once the physical memory page corresponding to the virtual memory page has been allocated and initialized by the operating system, control flows to logical step 314, where access to the physical memory page is carried out by the processor in the normal fashion through the memory hierarchy, as discussed above with reference to FIG. 1. In other words, the exception represents a deferred physical memory allocation for the virtual memory page upon attempted WRITE access by the process for which an immediate virtual memory page was allocated. If, on the other hand, immediate virtual memory is accessed for a READ operation, as determined in step 316, control flows to logical step 320, in which the processor logic returns the hardware-specified or software-specified value for the virtual memory location addressed by the virtual address contained in the register 308.

There are a number of ways the processor logic may return the hardware-specified or software-specified value. One method for returning the hardware-specified or software-specified value is to logically generate the hardware-specified or software-specified value under logic-circuit control. For example, logic circuits are straightforwardly implemented to return a zeroed natural computer word. In a second method for returning a hardware-specified or software-specified value, the processor may return the value stored in a specified register. In other words, if a read operation directs copying of the contents of a virtually addressed word to a register, processor logic can simply copy the contents of the specified register to the target register. Generation of hardware-specified or software-specified values under logic-circuit control, or copying of hardware-specified or software-specified value from specified registers, are preferred methods with respect to speed of access, since stored values need not be accessed through the memory hierarchy.

Although, as discussed above, zeroed virtual memory pages are the most commonly employed initialized virtual memory pages, other initializations may be desirable. For example, in certain systems, initializing all bits within a virtual memory page to the binary value "1" may be desirable for certain applications. As another example, many testing and simulation applications require a series of randomly generated numbers. Currently, simulation and testing programs commonly employ pseudo-random numbers generated by complex software routines. It is, however, fairly straightforward to generate truly random numbers by selecting random numbers from electronic noise generated by logic circuits or obtained from signal lines interconnected to various processor subsystems. It is therefore possible for processor logic to use truly random numbers obtained from electronic noise for initializing virtual memory pages. Testing and simulation applications can therefore obtain sequences of truly random numbers by simply reading numbers from newly allocated, immediate virtual memory pages. In certain embodiments, random-number-containing immediate virtual memory pages are read-only pages, and an attempted WRITE access to such a page generates an exception. In other embodiments, WRITE access would invoke the above described deferred physical memory allocation, and would result in an initially randon-number-filled page overwritten by the WRITE access. Additional types of initialization may also be desirable. For example, it may be desirable to initialize all bytes within a virtual memory page to the binary value "0010." Alternatively, more complex default initializations may be desirable for particular types of applications. For example, complex numeric patterns may be generated algorithmically, in response to various stored parameters, environmental variables, and other such inputs.

Figure 4:
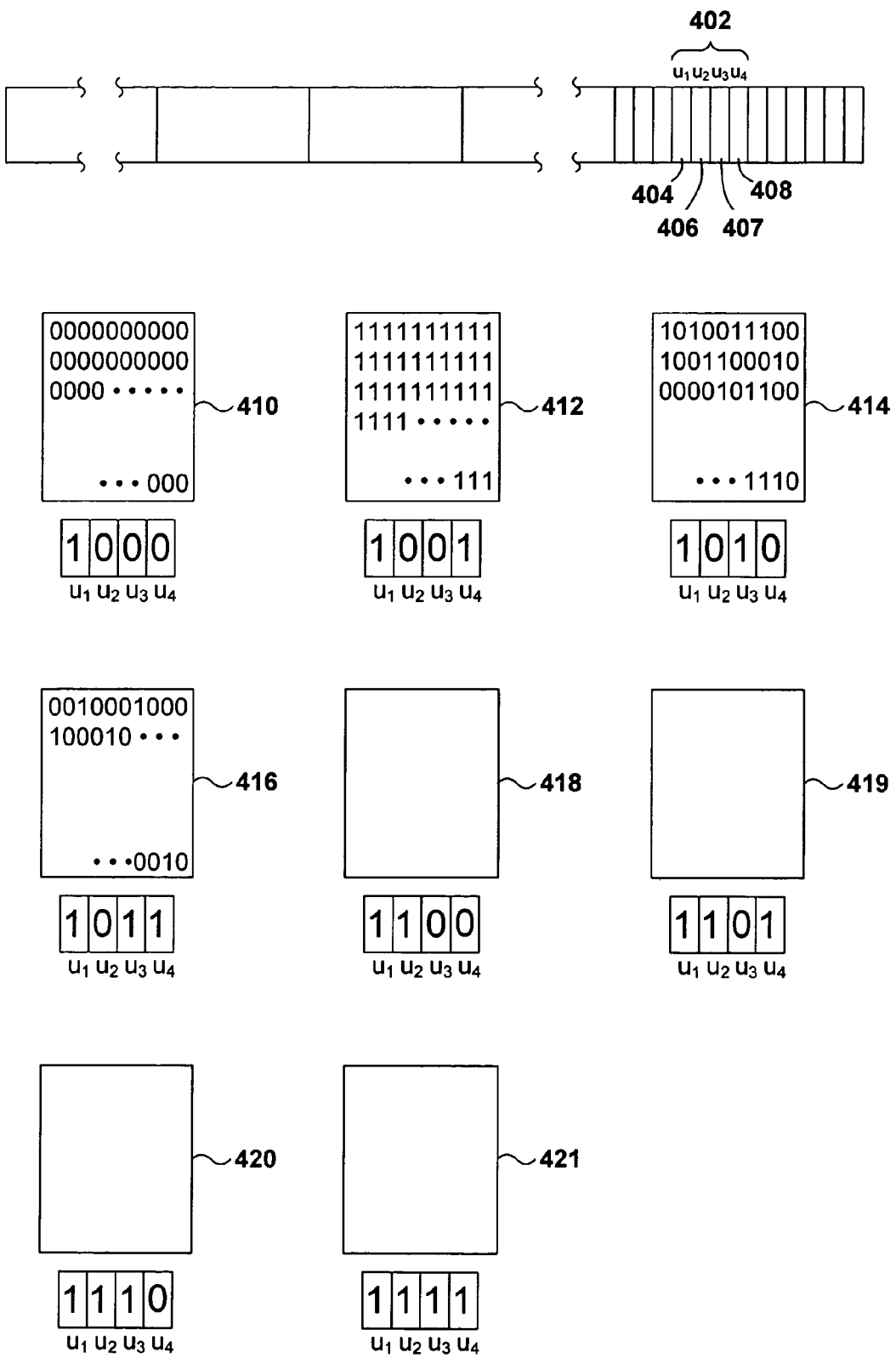
FIG. 4 illustrates an extension of immediate virtual memory to provide an arbitrary number of different default initializations according to one embodiment.

FIG. 4 illustrates an extension of immediate virtual memory to provide an arbitrary number of different default initializations. As shown in FIG. 4, a number of immediate bit flags 402 may be employed within each TLB entry. In one embodiment, the first immediate bit flag $U_1$ 404 may be used to indicate whether or not the corresponding virtual memory page is immediate, in the manner of the immediate bit flag discussed with reference to FIG. 3. The remaining three immediate bit flags, $U_2$, $U_3$, and $U_4$ 406-408, respectively, may be used to contain a value specifying a particular type of initialization. In FIG. 4, the three additional immediate bit flags are used to specify one of eight different types of default initialization, including an all-zero initialization 410, an all binary value "1" initialization 412, initialization with random numbers generated from electronic noise 414, initialization of each byte to the binary value "0010" 416, and other such default initializations 418-421. The logic shown in FIG. 3 may be simply extended to provide for the operating system, in logic step 318, examining the additional immediate bit flags to determine how to initialize a physical page in response to an immediate page exception, and by including logic circuits or special default registers for generating each of the different types of default initializations and selecting the appropriate default initialization value to return, in logic step 320, upon READ access to a virtual address within an uninstantiated virtual memory page.

Therefore, in one embodiment, a single immediate virtual memory page bit flag may be employed to defer allocation and initialization of virtual memory pages until the virtual memory pages are accessed for write operations, at which point the operating system allocates and initializes the virtual memory pages to a single default initialization value. Alternate embodiments employ different default initialization values. In still different embodiments, a plurality of immediate bit flags are employed within each TLB entry to specify one of a number of different possible initializations, including a variety of different bit patterns or truly random numbers generated from electronic noise.

Figure 5:
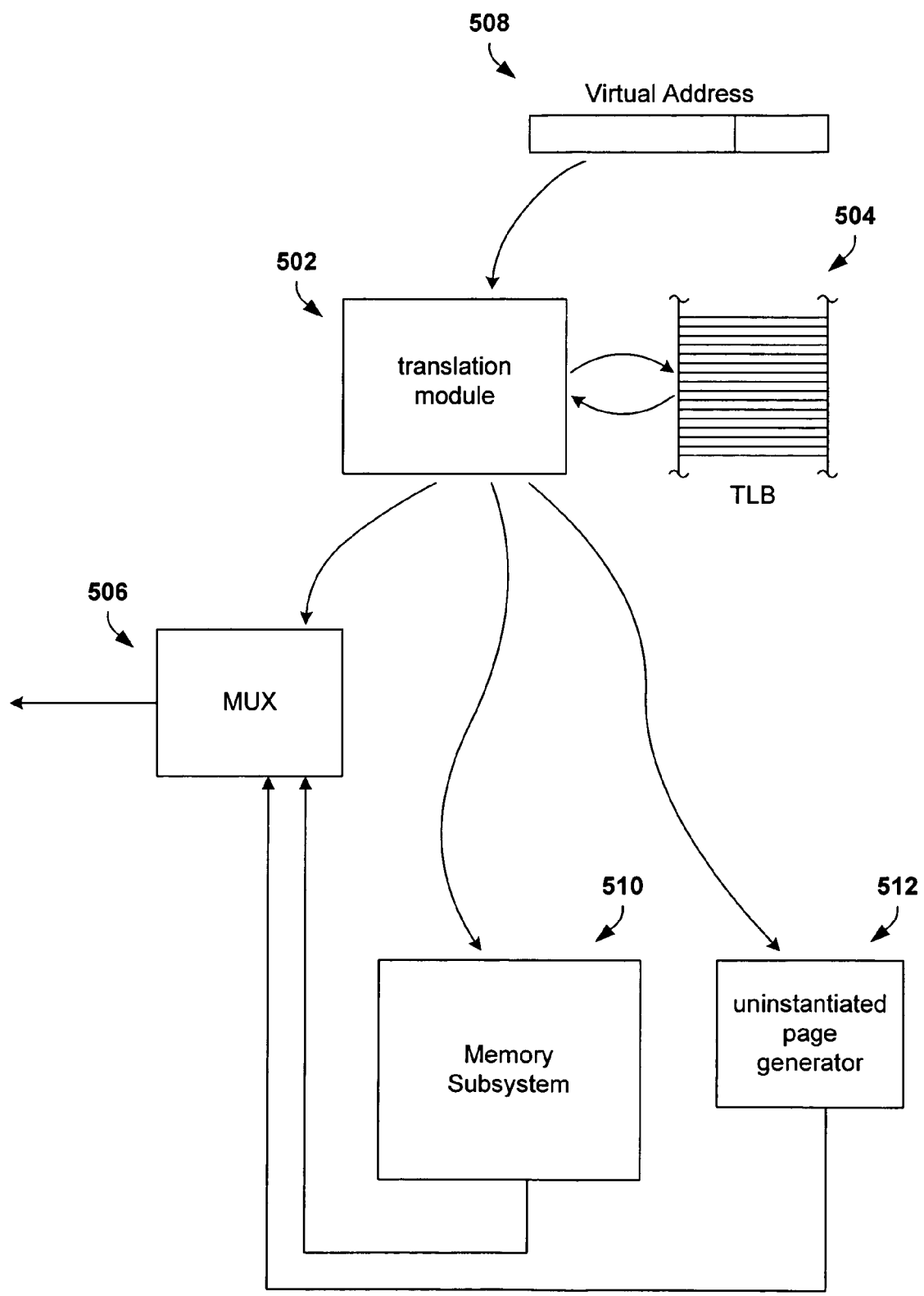
FIG. 5 illustrates logical-circuit components within a processor needed to implement immediate virtual memory according to one embodiment.

FIG. 5 illustrates logical-circuit components within a processor needed to implement immediate virtual memory. The logic circuits include the logic shown in FIG. 3 included within a translation module 502, a TLB 504 containing TLB entries that include one or more immediate bit flags, as discussed above, and a multiplexer ("MUX") 506 controlled by the translation module to return a value corresponding to a supplied virtual address 508 either from the memory subsystem 510 or from an immediate-virtual-memory-page-value generator 512. When the TLB entry corresponding to a supplied virtual address indicates that the virtual address is included within an immediate virtual memory page, as discussed above, logic within the translation module 502 controls the MUX to return a value generated by the immediate-virtual-memory-page-value generator 512. Otherwise, logic within the translation module 502 controls the multiplexor 506 to return a value fetched from the memory system by the memory subsystem 510. Note that, in tandem with controlling the MUX 506, logic within the translation module needs to supply a physical page number to the memory subsystem 510, in the case of translating an immediate virtual address, and to supply an indication of the type of initialization to the immediate-virtual-memory-page-value generator 512 when more than one type of initialization is possible. When more than one type of initialization is possible, the particular initialization used may be controlled programmatically by processes through operating system-memory allocation calls, may be specified by the operating system based on the identity of the process and the time and location of the allocated memory, among other considerations, or may be specified in other manners. As discussed above, the operating system, in handling immediate-virtual-memory-page exceptions, needs to initialize newly allocated physical pages corresponding to virtual memory pages in a manner identical to the generation of values by the immediate-virtual-memory-page-value generator 512. Also, as discussed above, the initialization values may be generated by logic circuits, may be initially generated and placed into special initialization registers during system boot or operating-system initialization, or virtual addresses for immediate virtual memory pages may be mapped to special, already initialized default-valued physical pages within the memory hierarchy.

Although the present invention has been described in terms of a particular embodiment, it is not intended that the invention be limited to this embodiment. Modifications within the spirit of the invention will be apparent to those skilled in the art. For example, an almost limitless number of different hardware, firmware, software, or combination hardware, firmware, and hardware, firmware, software implementations of uninstantiated virtual memory pages are possible. The immediate bit flags are most conveniently stored in TLB entries, but may also be stored in other, similar operating-system data structures that track the locations of virtual memory pages. As discussed above, a single default initialization may be employed for virtual memory pages, or a number of different types of initializations for virtual memory pages may be employed and selected via operating-system calls, based on process type and identify, based on allocation areas, or based on other such criteria. The present invention may be incorporated into any number of different computer architectures and computer-operating-system architectures. For certain processors, existing processor registers, faults, and exceptions may be used, with slight changes to firmware, in order to implement uninstantiated virtual memory pages, while for other processor architectures, a more substantial change may be required.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for providing immediate virtual memory within a computer system, the method comprising:
    allocating a new translation for a virtual memory page; and
    setting one or more bit flags within the translation to indicate that the translation specifies an immediate virtual memory page.

2. The method of claim 1 wherein the new translation is a translation look-aside buffer entry allocated within a translation look-aside buffer.

3. The method of claim 2 wherein the new translation look-aside buffer entry is a translation look-aside buffer entry allocated within a virtual hash page table.

4. The method of claim 1 wherein the new translation is allocated within a memory-resident operating-system data structure.

5. The method of claim 1 wherein, when immediate virtual memory is accessed by a READ access instruction, a specified value is returned.

6. The method of claim 5 wherein the specified value is generated by a processor logic circuit.

7. The method of claim 5 wherein the specified value is obtained from a default-valued processor register.

8. The method of claim 5 wherein the specified value is specified by one of:
    a software specification within an operating system; or
    a hardware logic circuit.

9. The method of claim 5 wherein The specified value is 0.

10. The method of claim 5 wherein the specified value is any fixed, non-zero bit pattern of any size.

11. The method of claim 5 wherein the specified value is a random number obtained by processor logic algorithmically, from electronic noise, or from another physical source.

12. The method of claim 1 wherein, when immediate virtual memory is accessed by a WRITE access instruction, an exception is generated to allow an operating system to allocate and initialize a physical memory page corresponding to the virtual memory page.

13. A computer processor that provides architecture support for immediate virtual memory, the computer processor comprising:
    processor logic for executing computer instructions and fetching instructions and data from memory; and
    processor logic for reading one or more control bits within a translation and determining whether or not a corresponding unit of memory is immediate.

14. The computer processor of claim 13 further including:
    processor logic that, upon READ access to memory determined to be immediate, returns a specified value; and
    processor logic that, upon WRITE access to immediate memory, generates an immediate memory exception to allow an operating system to allocate and initialize physical memory corresponding to the immediate memory.

15. The computer processor of claim 14 wherein the specified value is generated by a processor logic circuit.

16. The computer processor of claim 14 wherein the specified value is obtained from a specified processor register.

17. The computer processor of claim 14 wherein the specified value is 0.

18. The computer processor of claim 14 wherein the specified value is any fixed, non-zero bit pattern of any size.

19. The computer processor of claim 14 wherein the specified value is a random number obtained by processor logic algorithmically, from electronic noise, or from another physical source.

20. The computer processor of claim 14 wherein the specified value is specified by one of:
    a software specification within an operating system; or
    a hardware logic circuit.

21. An operating system on a computer readable medium that when executed allocates an immediate virtual memory page within a computer system by:
- allocating a new translation for the virtual memory page; and
- setting an immediate bit flag within the translation to indicate that the corresponding virtual memory page is immediate, with no allocated physical memory.

22. The operating system of claim 21 wherein the new translation is a translation look-aside buffer entry allocated within a translation look-aside buffer.

23. The operating system of claim 22 wherein the new translation look-aside buffer entry is a translation look-aside buffer entry allocated within a virtual hash page table.

24. The operating system of claim 21 wherein the new translation is allocated within a memory-resident operating-system data structure.

25. The operating system of claim 21 wherein, when an immediate virtual memory page is accessed by a READ access instruction, a specified value is returned.

26. The operating system of claim 25 wherein the specified value is generated by a processor logic circuit.

27. The operating system of claim 25 wherein the specified value is obtained from a specified processor register.

28. The operating system of claim 25 wherein the specified value is 0.

29. The operating system of claim 25 wherein the specified value is −1 in two's complement arithmetic.

30. The operating system of claim 25 wherein the specified value is a random number obtained by processor logic algorithmically, from electronic noise, or from another physical source.

31. The operating system of claim 21 wherein, when an immediate virtual memory page is accessed by a WRITE access instruction, an immediate-virtual-memory-page exception is generated to allow the operating system to allocate and initialize a physical memory page corresponding to the virtual memory page.

* * * * *

UNITED STATES PATENT AND TRADEMARK OFFICE
CERTIFICATE OF CORRECTION

| | |
|---|---|
| PATENT NO. | : 7,313,668 B2 |
| APPLICATION NO. | : 10/768306 |
| DATED | : December 25, 2007 |
| INVENTOR(S) | : John S. Worley |

It is certified that error appears in the above-identified patent and that said Letters Patent is hereby corrected as shown below:

In column 3, line 60, delete "modem" and insert -- modern --, therefor.

In column 8, line 21, in Claim 9, after "wherein" delete "The" and insert -- the --, therefor.

Signed and Sealed this

Twenty-seventh Day of May, 2008

JON W. DUDAS
*Director of the United States Patent and Trademark Office*